United States Patent [19]

Doyle

[11] 4,039,825
[45] Aug. 2, 1977

[54] POSITION INDICATING SYSTEM
[75] Inventor: Keith Gilbert Doyle, Bromley, England
[73] Assignee: Zed Instruments Limited, England
[21] Appl. No.: 639,777
[22] Filed: Dec. 11, 1975
[30] Foreign Application Priority Data
Dec. 16, 1974 United Kingdom .............. 54262/74
[51] Int. Cl.$^2$ .......................... G01J 1/20; H01J 39/12
[52] U.S. Cl. ............................... 250/203 R; 356/152; 356/172; 250/208
[58] Field of Search ................ 250/203; 356/172, 141, 356/152, 158, 208

[56] References Cited
U.S. PATENT DOCUMENTS

| 3,435,246 | 3/1969 | Webb | 250/203 |
| 3,816,000 | 6/1974 | Fiedler | 356/172 |
| 3,894,230 | 7/1975 | Rorden et al. | 250/203 |
| 3,907,435 | 9/1925 | Roodvoets | 250/208 |

FOREIGN PATENT DOCUMENTS

1,359,581   7/1974   United Kingdom ................ 250/203

Primary Examiner—Alfred E. Smith
Assistant Examiner—David K. Moore
Attorney, Agent, or Firm—Harold L. Stowell

[57] ABSTRACT

The invention concerns apparatus for indicating the position of a light beam relative to a target, comprising an optical system, as many linear arrays of photoelectric elements as the number of coordinates in which the position indication is sought, and an electronic circuit arrangement for processing the video output signals of the arrays, wherein the optical system forms a virtual source of the beam and special lenses form a narrow, band-like image of the virtual source on each array, and the circuit arrangement uses an integration technique for detecting the center of the distribution of the video output signals.

18 Claims, 7 Drawing Figures

POSITION INDICATING SYSTEM

The invention relates to a position indicating system for indicating the position of a light beam along a given direction, or in terms of two mutually orthogonal coordinates, say $x$ and $y$; or in a further development of the latter, in terms of two mutually orthogonal coordinates and at least one component (say, horizontal) of the angle of the light beam with a given axis.

In many fields, such as mining, rock drilling and tunnel boring, it is important for the operators of the mining, drilling or boring machine to monitor whether the machine is on course and if it is not, to make rapid and accurate corrections. In particular, in tunnelling it is of great importance not to interfere with or damage existing service pipes during work. The task is even more complicated where the machine is itself on ground inclined at an angle to the horizontal; in addition, cutters are known which utilise cutting tools mounted on rotary turrets or booms that can swing both in horizontal and vertical planes, which further complicates accurate positioning.

It is known for position monitoring purposes to utilize a laser beam which is arranged to impinge on the workface. One current practice is for an operator to keep an eye on the "spot" of the beam to effect corrections, if deemed necessary. Such corrections are, however, not very accurate and at best only quasi-quantitative. Another current practice is to attach a target e.g. a paper card to the machine on which the laser beam impinges and an operator keeps the resulting spot of light under observation. In addition to the already mentioned problem, the further problem may arise that a displacement of the machine, e.g. a rolling movement, causes the target to move also, causing relative movement between the target and the beam which latter may "disappear" off the card.

Clearly the current practices are insufficiently accurate, prone to human error, as well as placing an additional burden on the operator of the machine.

A further problem is that often it would be desirable to provide accurate data or information of the position of the laser beam not only underground at the site of the operation, but also above ground e.g. for control personnel and/or for remote control, automatic control and for processing the data received.

The present invention seeks to eliminate or at least reduce the above- enumerated disadvantages and to provide an indicating/positioning system capable of showing the position of a light beam, in a direction or in terms of two coordinates, relative to a target, and optionally to provide also information about the angular position of the beam.

The present invention accordingly consists in apparatus for indicating the position of a light beam relative to a target, the apparatus comprising a system of optical elements, at least one linear array of photoelectric elements adapted to produce a video output signal and an electronic circuit arrangement for processing the video output signal of the or each array of photoelectric elements, wherein: the system of optical elements includes means for producing a virtual source of said beam and imaging means adapted to produce a narrow, generally band-like image of the virtual source on the or each of the arrays, and the said circuit arrangement includes means for detecting the centre of distribution of the video output signal(s).

In one preferred embodiment of the present invention for indicating the position of a light beam relative to a target by at least two coordinates, the apparatus comprises at least two discrete, spaced apart, linear arrays of photoelectric elements, the imaging means being adapted to produce a narrow generally band-like image of the virtual source on each of the array so that the respective images are inclined to each other in correspondance with the mutual inclination of the sought to be obtained; the linear arrays being disposed substantially at a relative inclination correspondingly and being arranged to produce video output signals independently of each other. It should, however, be appreciated that where the apparatus according to the invention is used with a single array, e.g. in distance measurement, with appropriate modifications to the system of optical elements, the electronic signal processing arrangement remains essentially unchanged. Moreover, the single array will provide an output which is independent of the position of the beam in terms of a co-ordinate inclined, say, at 90° to the one being measured by the single array.

In a further development of the invention, the system of optical elements includes means for producing a second virtual source of said beam independently of the first-mentioned such means, at least one further linear array of photoelectric means, and further imaging means for producing a narrow, generally band-like image of the second virtual source on the or each said further linear array, the position of this image being dependent only on the angle the incident beam makes with the axis of the apparatus.

Preferably, the first-mentioned means for producing a virtual source of said beam is a diffusing screen or a condenser lens provided with a diffusing surface, or a sub-unit consisting of a superposed diffusing screen and a Fresnel lens. In the embodiment where the angle of inclination of the beam is to be measured also, the screen may be a screen provided with an array of through-going apertures, or with a pattern of diffusing areas and transmitting areas wherein the ratio of perforated to unperforated (or diffusing to transmitting) screen areas is preselected according to requirements. However, it is always ensured that for a given beam diameter there should be at least two apertures, or transmitting areas.

The imaging means may be constituted by a cylindrical or planecylindrical lens associated with and placed adjacently to the or each linear array.

In a preferred embodiment, the photoelectric elements are photodiodes, the or each array being positioned off the central axis of the condenser lens.

Preferably, for the measurement of two orthogonal coordinates with two arrays, the said arrays are arranged to be substantially co-planar. When additionally angular inclination is to be measured, the third array is preferably in a plane further away from the source of light than the said co-planar arrays; and if there is a fourth array provided, e.g. where the third and fourth arrays are to measure the inclination of the beam with the axis of the apparatus in two mutually, orthogonal directions, the third and fourth arrays are preferably co-planar and extend generally at right-angles to each other.

The circuit arrangement may include means for analysing the video output of the single array, or for sampling the respective video output signals of each of the plurality of the linear arrays sequentially; and it includes an integrator device for measuring the total intensity of illumination of a given peak in the video output and for finding the exact pulse centre in the next successive pulse.

The integrator device may be provided with means for starting and stopping the integration at substantially the same level; it may be arranged to stop on reaching the centre of the next successive peak and to follow it if displaced; and it may include a transistor arrangement to form a current source for a capacitor one side of which is connected to the common line of the circuit.

Preferably, a display and/or recording and/or data processing unit is connected to the said circuit arrangement. The display unit may be a digital display board having ± deviation indications for the or each coordinate as well as a no-deviation indication.

Means may be provided for locking the indications in the case where the beam is extraneously interrupted or moves outside the optical system; and it may be arranged that after a predetermined time an audio and/or visual warning is given.

The invention described, by way of example only, with reference to and as shown in the accompanying diagrammatic drawings, wherein.

Figure 1:
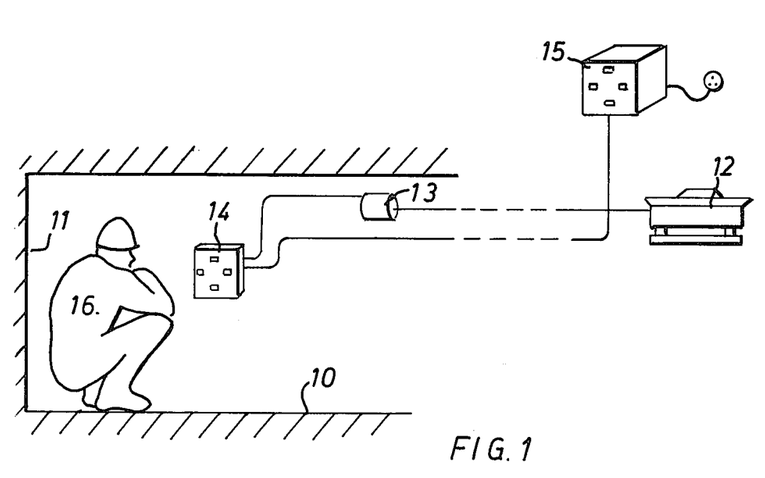
FIG. 1 shows the general spatial arrangement of the apparatus in its application to tunnelling in the embodiment where position indication in two orthogonal coordinates is provided.
Figure 2:
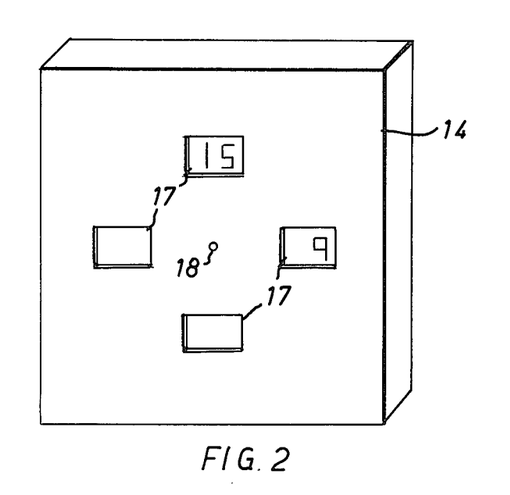
FIG. 2 is an enlarged perspective view of the display unit of the apparatus shown in FIG. 1.

Referring first to FIGS. 1 and 2, there is shown diagrammatically a tunnel 10 having a workface 11 operated on by e.g. a boring machine, not shown. Disposed at some distance from the workface is a laser 12 adapted to emit a continuous visible beam. The laser beam defines the direction or true course along which it is desired to advance the machine.

In this embodiment of the invention, a position sensing and indicating unit 13 for providing indication in two mutually orthogonal directions and described in greater detail below, is located in the path of the laser beam. The unit 13 is connected by cables to an underground display unit 14 and a surface display unit 15, the former being watched in use by work personnel 16 in the tunnel 10.

The units 14 and 15 are generally similar, but the latter is integrally housed with a power supply unit. Each unit has a metal casing with four windows 17 located as shown to correspond to ± x and ± y indications, respectively. Behind the windows 17 digital indicating means, preferably light-emitting diodes (LED's) are provided. At the centre there is a lamp 18, which comes ON to show "no error". If the beam is obstructed or moves completely off the target, the display is arranged to flash after a predetermined time interval, while the unit will have the last reading obtained locked on display. This visual warning may be complemented with or replaced by an audio warning, such as a buzzer, bell or klaxon.

Figure 3:
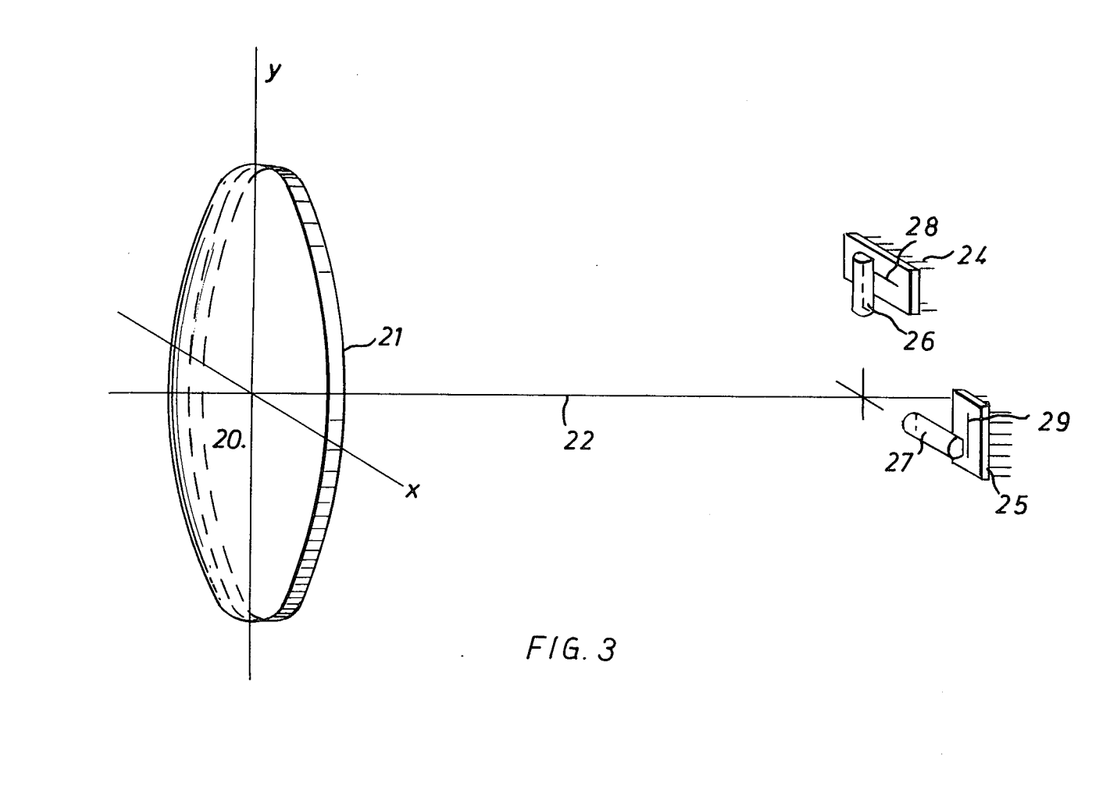
FIG. 3 is an enlarged schematic perspective view of part of the position sensing apparatus according to the embodiment of the invention where position indication in two orthogonal coordinates is provided.

Referring now to FIG. 3, the unit 13 includes a circular planoconvex condenser lens 20 having a diffusing surface 21. The centre line or axis of the apparatus, as well as of the lens 20, is indicated in broken lines and is designated by the reference number 22. The lens 20 may have a diameter larger than that of the laser beam, but this is not critical. The lens 20 with its diffusing surface 21 forms a real image (virtual source) of the laser "spot" and improves the distribution of light over the full target area. The virtual source moves with movements of the laser beam.

It should be appreciated here that the diameter of the beam of the usual commercially available lasers may not be constant in time but may be subject to fluctuations about a mean value, and that, moreover, the beam diameter is a function of its distance from the source; accordingly, the apparatus according to this invention is designed to take these factors into account and to provide accurate indication at all times.

Spaced from the lens 20 and positioned off the axis 22 are two discrete "linear" array 24, 25 of photoelectric elements which are preferably made up of solid state photodiodes integrated together with address circuitry to obtain video information from the diodes achieved by an adjacent shift register which accesses each photodiode in turn as a logic signal is passed through the register. Such arrays are known and one convenient type is marketed in different lengths varying from 16 to several hundred diodes by Integrated Photomatrix Limited of Dorchester, Dorset, England. Their mode of operation has been described e.g. in "Control and Instrumentation", September 1973, and accordingly no further description is given here. However, other types of arrays operating on different principles may be used, e.g. charge-coupled devices, to perform the same function.

The two arrays 24, 25 are coplanar and are oriented with their "linear" dimensions or "lines" 28, 29 mutually at right angles to each other in correspondance with the two orthogonal coordinates of the beam position that are to be measured. In front of each array 24, 25 on the side facing the lens 20 is a respective cylindrical lens 26, 27 adapted to focus the image of the "spot" on the lens on to the associated array 24, 25. Moreover, each cylindrical lens distorts that image into a relatively narrow strip or band respectively perpendicular to the "line" 28 or 29, respectively, of the associated array 24 or 25.

As can be seen, the lenses 26 and 27 are also disposed mutually perpendicularly.

The illustrated spatial arrangement of the discrete linear arrays of photodiodes and associated lenses resolves the real image on the lens 20 into two images which are independent of each other and which correspond to the position of the real image in two orthogonal coordinates. If the x, y axes passing through the lens 20 are as shown in FIG. 3, then the array 24 registers the x position only while the array 25, independently of array 24, registers the y position only. As a result, the arrays need not be on the axis 22.

Figure 4:
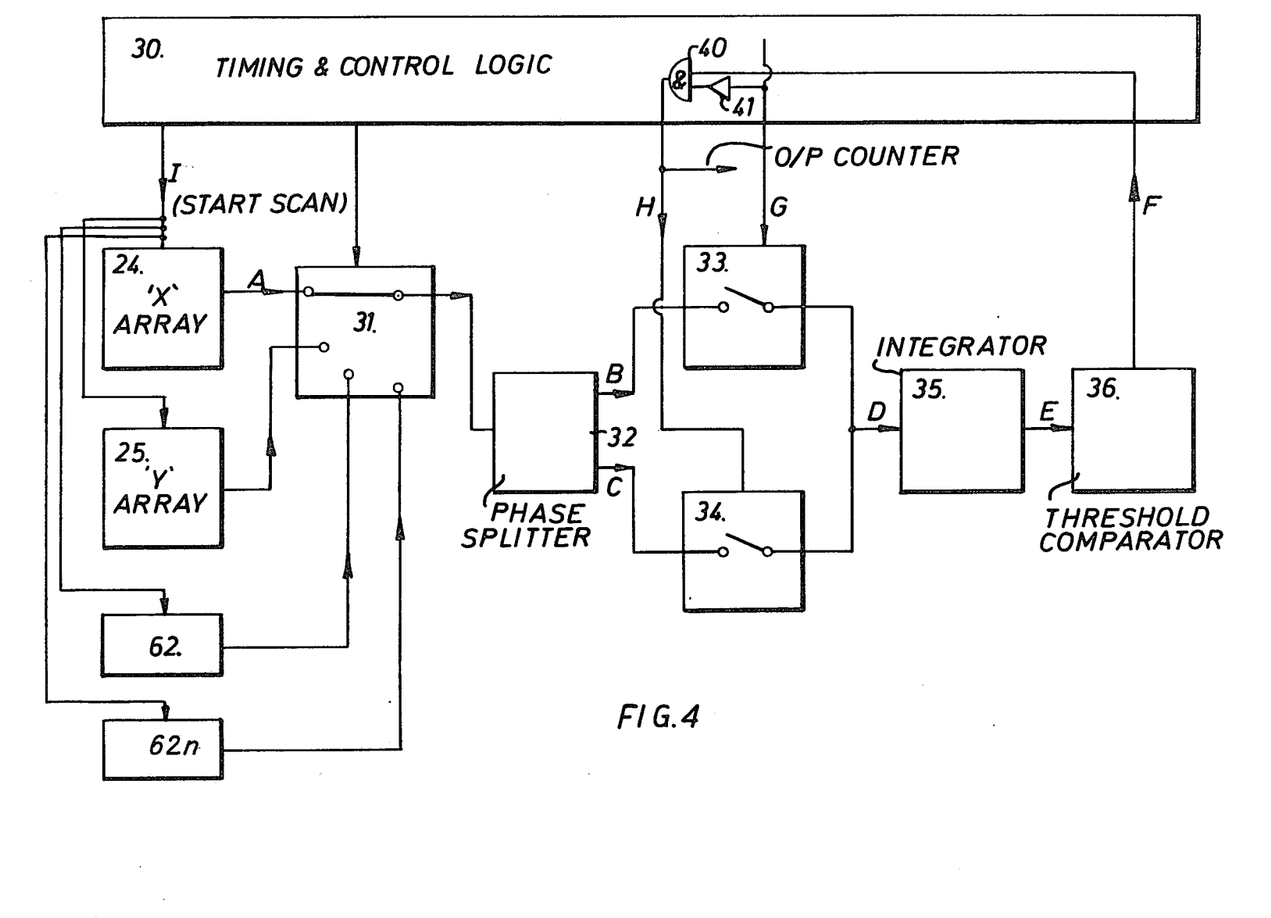
FIG. 4 is a block diagram of electronic video signal processing circuitry embodied in the invention, for use with all embodiments.
Figure 5:
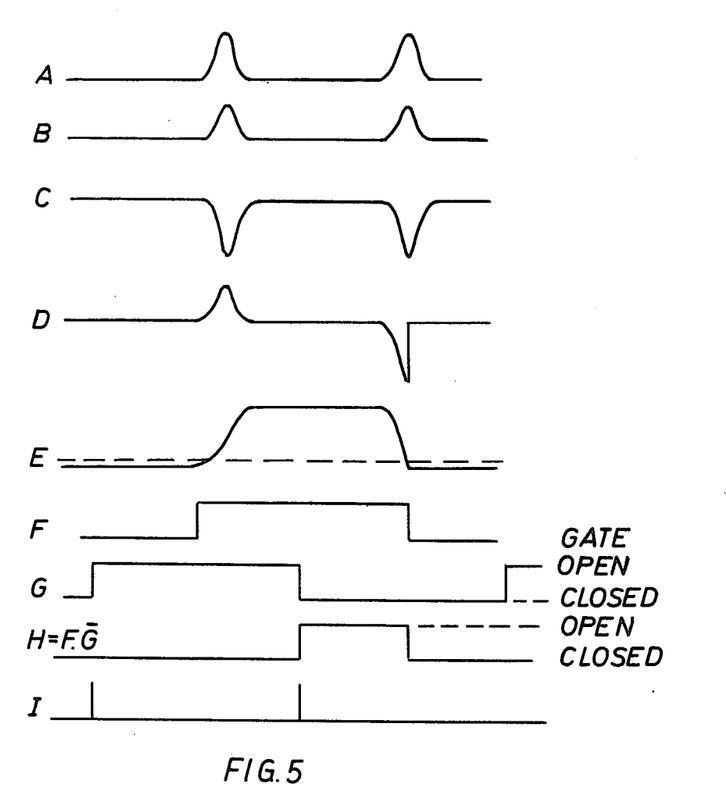
FIG. 5 shows the waveforms obtaining in various parts of the circuitry shown in FIG. 4.

In order to process the video output of the photodiode arrays, an electronic circuit arrangement is provided, a block diagram of which is shown in FIG. 4. The various voltage waveforms arising in the circuit are shown in FIG. 5.

The arrangement comprises a timing and control logic module 30, an electronic switch 31 (omitted when only one array is used), a phase splitter 32, gating devices 33, 34 an integrator 35 and a threshold comparator 36, interconnected as shown.

The module 30 incorporates the circuitry associated with the integrated photodiode arrays already adverted to above, i.e. the clock pulse generators for producing two non-overlapping clock pulses which shift through the register and sequentially open and close MOS switches in order to connect each photodiode in turn to the video line and a start scan pulse generator for producing the start scan pulse I. This pulse clocks through the shift register, charges each photodiode in turn to the negative supply potential and then open-circuits it. The charge lost before the next pulse I by each diode is proportional to the total amount of light falling thereon. The next pulse I recharges the diodes to line potential and accesses the charge lost to the video line.

The switch 31 is provided to enable the arrays 24 and 25 to be sampled sequentially and alternately. Typically, the switch 31 is open for each array for 1 second during which a large number of pulses (a few milliseconds apart) pass. The results are averaged over 1 sec by a binary counter (not shown).

The voltage waveform A of the arrays is shown as a smooth curve but in reality it represents very numerous stepped changes. The first peak is used, as described below, to measure the total intensity of the incident light while in the second peak the circuit finds the exact centre of the distribution.

The signal from the sampled array passes to the phase splitter 32 which gives two outputs B and C. Output B is diminished in amplitude while output C is doubled in amplitude as well as inverted. The reason for this is that it is desired to integrate up over the whole waveform between two successive I pulses which represents the distribution of light along the array, while in the second scan it is desired to integrate up to the top of the peak only. So it is more convenient to do so in the negative direction at twice the rate to find the zero level than to find half the height of the peak at a positive level.

Signals B and C are passed through logic gating units 33 and 34 respectively activated from the module 30 by pulses G and H, described below. The output D from gating units 33, 34 is passed to an integrator device 35. In this invention it has been found that owing to the high frequencies involved, the usual operational amplifiers are not suitable for performing the integration. Instead, a circuit arrangement not shown in detail is used, involving a transistor current source feeding a capacitor referenced to the ground, i.e. having one side connected to the common line of the circuit.

The reference level of the integrator output waveform E is shown in dotted lines. E is passed to the threshold comparator 36 which includes a Schmitt trigger. An arbitrary reference voltage is provided for the comparator, which has hysteresis higher than the peak of noise.

It is to be noted that the integrator 35 is arranged to stop at the same level as it starts irrespective of whether that level coincides with a transition in the waveform of the second A-pulse. In other words, the trailing edge of E coincides in time with the peak of the second peak in A and triggers the pulse F. The pulse F is passed into module 30 which contains an AND-gate 40, and an inverter 41 connected to the AND-gate 40 and the line carrying the G-pulse which is derived from a main counter in the module 30. Thus the pulse H = F·G, i.e. is the logical product of F and G-inverted. The output of the circuit is taken from H to a counter (not shown) to produce, eventually, the digital indications in the units 14 and 15.

The length of the pulse H is thus proportional to the length of the time interval or delay between the second I-pulse and the centre of the second A-pulse.

It will be appreciated from the foregoing that the circuit processes the photodiode output in an analogue manner. The integration technique employed provides a means for detecting the centre of the A-pulse in a manner which is insensitive to the possibly poor shape of the pulse and to discontinuities in the pulse. Consequently the resolution of the system is better, in fact approximately 10 times better, than the typical laser beam diameter and eliminates errors due to the above-described fluctuations in or instability of the beam diameter. This resolution is better than could be achieved by merely counting the illuminated diodes in the arrays.

The preferred embodiment of the invention hereinabove described thus achieves position sensing for two orthogonal coordinates by the use of two unidimensional arrays, at a higher resolution than hitherto considered achievable. It does this without resorting to a two-dimensional array matrix, which would necessitate using $n^2$ photodiodes instead of $2n$, where $n$ is the number of photodiodes in one linear array as used herein. Furthermore, no mechanical or thermionic scanning device is required for practising the invention.

Figure 6:
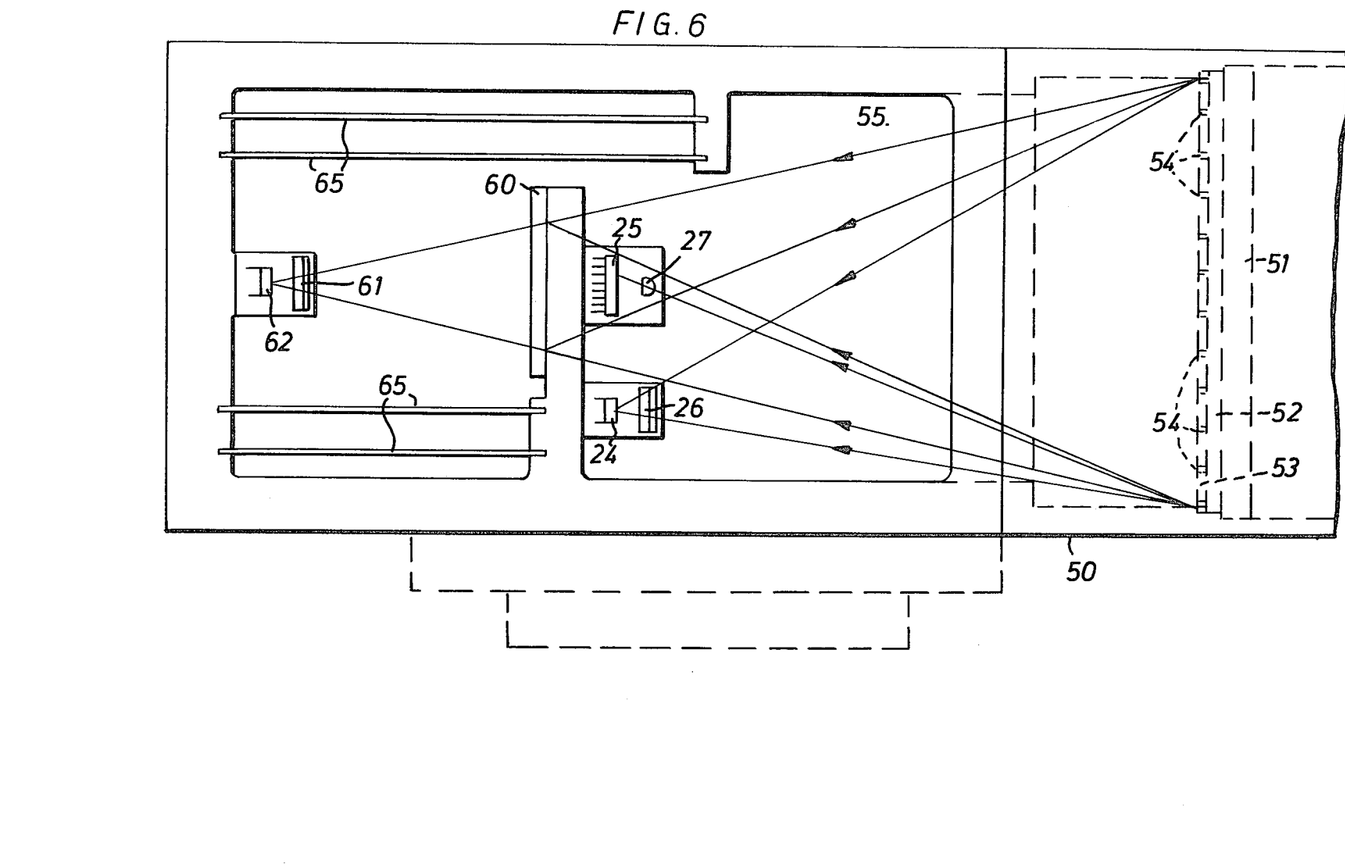
FIG. 6 is a diagrammatic side elevational view of the embodiment of the apparatus according to the invention utilising three arrays of photo-electric elements, the appropriate side panel of the casing of the apparatus being removed.
Figure 7:
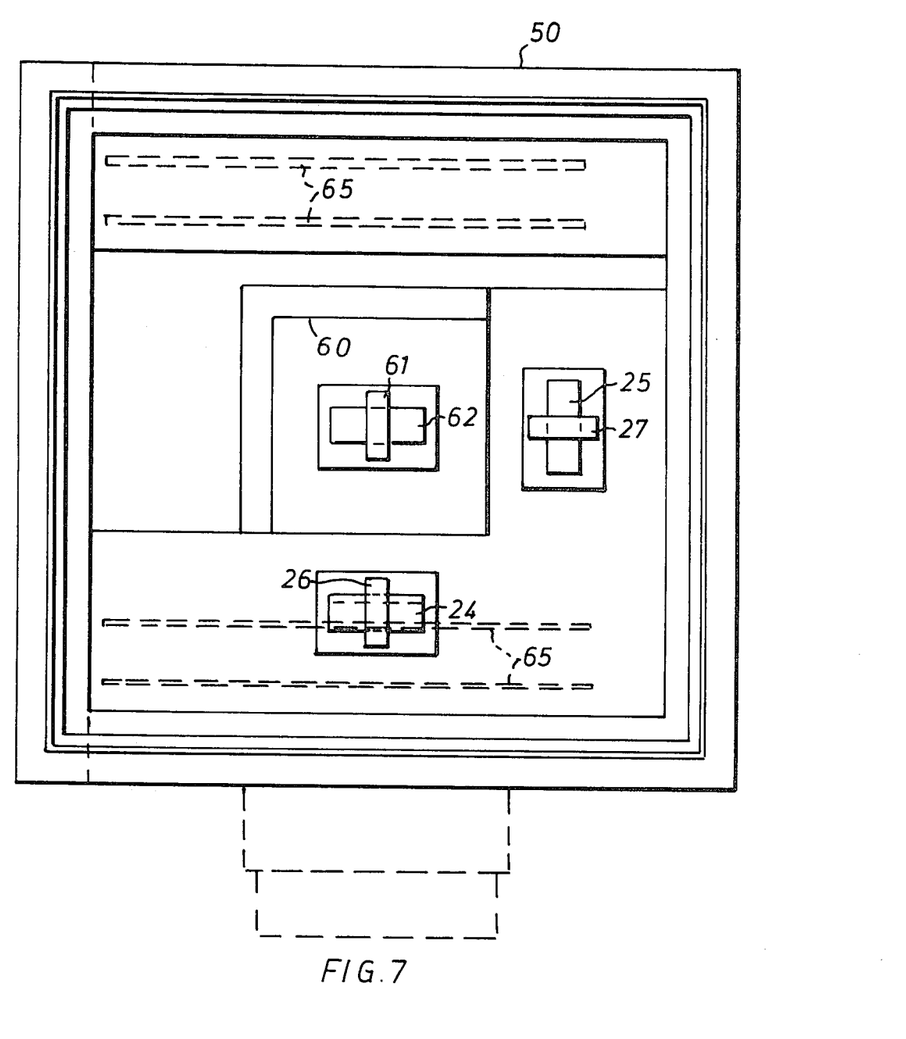
FIG. 7 is an end elevation of the apparatus according to FIG. 6, with certain parts removed for the sake of clarity.

Referring now to FIGS. 6 and 7, there is shown an embodiment of the invention which is a development of the embodiment shown in FIGS. 1 to 5 and which utilises a third linear array of photodiodes to measure, in addition to the two orthogonal co-ordinates such as $x$ and $y$, one component of the angular inclination of the beam to the axis of the apparatus. Like reference numbers have been allotted to the same or functionally equivalent parts.

The apparatus according to FIGS. 6 and 7 is housed in a casing 50 containing a window 51 at the right-hand side (as viewed) for the entry of a laser beam, or a beam of collimated light. The beam passes through a Fresnel lens 52 and a diffusing screen 53 which is provided either with a pattern of through-going apertures 54 of a predetermined size, or with a pattern of transmitting areas. The ratio of the total area of the perforations or transmitting areas to the unperforated or diffusing areas of the screen 53 is preselected, according to the intended use. As before, Fresnel lens 52 and the unperforated part of the screen 53 co-operate to provide a virtual source from which diffused light passes to the interior 55 of the casing 50. As in the preceding embodiment, two discrete linear photodiode arrays 24, 25 are positioned off the effective axis of the apparatus. As before, the arrays 24, 25 are co-planar and are oriented with their "lines" mutually at right angles. In front of each array there is, again, a respective cylindrical lens 26, 27 to focus and distort the light beam into a narrow band-like image. No further description of this part of the apparatus is considered necessary.

Immediately behind the arrays 24, 25 is a diffusing screen 60 receiving light that has passed directly through the perforations or transmitting areas of the screen 63 as well as light diffused thereby. The lens 52 serves to even out the intensity distribution of the light received at the screen 60. The screen 60 is a plain screen made e.g. of polystyrene film. It will be appreciated that the lens-screen assembly 52, 60 acts essentially as a telescope and the position of the virtual source on the screen 60 is independent of where the light is incident: it is dependent only on the angle of the beam makes with the axis of the apparatus.

In the illustrated embodiment, the illustrated light beams from the screen 60 pass via a cylindrical lens 61 to a third linear photodiode array 62, the orientation of the parts 61, 62 being such that the horizontal component of the angle of incidence is measured. Of course, the arrangement "downstream" of the arrays 24, 25 can readily be doubled up to provide measurement of the vertical component of the angle of incidence. This possibility is indicated in FIG. 4. The casing 50 further includes means for supporting circuit boards 65 for the circuitry shown in FIG. 4. The circuitry requires very little modification for the FIGS. 6–7 embodiment: for each additional array, such as array 62n, there is an additional connection to the switch 31 which is provided with the appropriate number of additional sampling positions so that the arrays 24, 25, 62, . . . 62n are sampled sequentially. The voltage waveforms are, as before, as shown in FIG. 5. Conversely, as has already been stated, the single-array embodiment requires only a minor modification not affecting the essence of the function of the circuitry, viz. the integrating technique for detecting the centre of the A-pulse. Moreover, the single-array embodiment shares with the other embodiments the advantages of the excellent resolution of the electronic circuitry, the independence of the measured values from components of those values in other directions.

It will be appreciated that the embodiment of FIGS. 6 and 7 is very advantageous in providing additional information and does so with the aid of simple and economic means. The physical size of the apparatus remains compact. The use of the perforated screen is far preferable to, say, the use of beam splitters which would involve the need to align, and to maintain in alignment, a large number of components.

It will be evident that a number of modifications are possible within the scope of the present invention. Thus the lens 20 could be replaced by a diffusing screen. The cylindrical lenses 26, 27 could be replaced by other optical elements of equivalent focusing and distorting effect. The photodiode arrays 24, 25 need not be of the integrated type, but could instead each be a discrete array. While it is desirable to ensure coplanarity of the arrays, the optical elements 26, 27 could be adjusted to compensate for non-coplanarity, provided the solid angle subtended by each array with the light spot remains unobstructed over the full range of possible spot movements. The source of light need not, of course, be a laser. The circuit could be "doubled up" for separately and simultaneously processing the video outputs of the respective arrays, rather than sequentially. Indeed, if so desired, the video outputs could be processed in a digital manner, but this is not preferred.

The invention could be adapted to provide an input to an automatic, remote control and correction system, rather than mere indication, and may then form part of a closed loop system.

The output of the electronic circuitry may be used, as an alternative or as an addition to indication, for data processing.

It is not, of course, essential to have orthogonality between the arrays when, say, two co-ordinates are being measured and the relative inclination of the co-ordinates in which the result is sought may be selected at will. Nor is the invention limited to two co-ordinates: in one application invention three co-planar arrays have been used at an angular spacing of 80°, 120° and 120°.

In another aspect of this invention for use in pattern recognition tasks, the apparatus consists, substantially as before, of the said system of optical elements, the said linear arrays of photoelectric elements and the said circuit arrangement. A collimated beam may be used and an object to be "recognized" is placed to intercept the beam. The apparatus is then used to "view" the outlines of the shadow of the object and the circuit arrangement is adapted for detecting the transitions from dark to light.

I claim as my invention:

1. Apparatus for indicating the position of a light beam relative to a target, comprising a system of optical elements, a linear array of photoelectric elements adapted to produce a video output signal and an electronic circuit arrangement for processing the video output signal of said array of photoelectric elements, wherein: the system of optical elements includes diffusing for producing a virtual source of said beam and imaging means adapted to produce a narrow, generally band-like image of the virtual source on said array, and the said circuit arrangement includes means for sampling the video output of said array; and an integrator device for measuring the total intensity of illumination of a given peak in the video output and for finding the exact pulse centre in the next successive pulse.

2. Apparatus according to claim 1 wherein means for starting and stopping the integration at substantially the same level is provided in the integrator device.

3. Apparatus according to claim 1 wherein at least one display and/or recording and/or data processing unit is connected to the said circuit arrangement.

4. Apparatus according to claim 3 wherein said at least one display unit is a digital display board havng ± deviation indications for said at least one coordinate as well as a no-deviation indication, means being provided for locking the indications in the case where in use of the beam fails to reach the target, and means for giving, after a predetermined time warning.

5. Apparatus for indicating the position of a light beam relative to a target by at least two coordinates, comprising a system of optical elements, at least two discrete, spaced apart, linear arrays of photoelectric elements and an electronic circuit arrangement for processing the video output signal of the photoelectric elements, wherein:
 a. the system of optical elements includes diffusing means for producing a virtual source of said beam and imaging means adapted to produce a generally narrow, band-like image of the virtual source on each of the arrays with the respective images being inclined to each other in correspondence with the inclination of the coordinates desired;
 b. the said at least two linear arrays are disposed at a relative inclination corresponding to the inclination of the coordinates desired and are arranged to produce video output signals independently of each other;

c. the said circuit arrangement includes means for sampling the respective video output signals of each said linear array and an integrator device for measuring the total intensity of illumination of a given peak in the video output and for finding the exact pulse centre in the next successive pulse.

6. Apparatus according to claim 5 wherein the imaging means is constituted by a plano-cylindrical lens respectively associated with and placed adjacently to said to least one linear array.

7. Apparatus according to claim 5 wherein the said arrays are positioned off the central axis of the apparatus, and are arranged to be substantially co-planar.

8. Apparatus according to claim 5 wherein means for starting and stopping the integration at substantially the same level is provided in the integrator device.

9. Apparatus according to claim 5 wherein at least one display and/or recording and/or data processing unit is connected to the said circuit arrangement.

10. Apparatus according to claim 9 wherein said at least one display unit is a digital display board having ± deviation indications for said at least one coordinate as well as a no-deviation indication, means being provided for locking the indications in the case where in use of the beam fails to reach the target, and means for giving, after a predetermined time, an audio and/or visual warning.

11. Apparatus according to claim 5, wherein the system of optical elements includes second diffusing means for producing a second virtual source of said beam independently of the first-mentioned such means, at least one further linear array of photoelectric means, further imaging means for producing a narrow, generally band-like image of the second virtual source on said at least one further linear array, the position of this image being dependent only on the angle the incident beam makes with the axis of the apparatus, and wherein the first-mentioned diffusing means for producing a virtual source of said beam is a screen which is partially light-transmitting to allow undiffused light to pass to said second diffusing means and partially diffusing to produce a virtual source of said beam for the firstmentioned imaging means.

12. Apparatus according to claim 11 wherein the screen is a diffusing screen perforated to provide a predetermined pattern of transmitting apertures and diffusing areas.

13. Apparatus for indicating the position of a light beam relative to a target by three coordinates, comprising a system of optical elements, three discrete, spaced apart, linear arrays of photoelectric elements arranged to produce video output signals independently of each other and an electronic circuit arrangement for processing the video output signals of the said arrays, wherein:
 a. the system of optical elements includes two spaced apart diffusing means each to produce a virtual source of said beam, three spaced apart imaging means each associated with a said array and adapted to produce a generally narrow, band-like image of said virtual source so that the respective images are inclined to each other in correspondence with the inclination of the coordinates desired;
 b. two of said linear arrays are substantially coplanar and are disposed at a relative inclination corresponding to the inclination of two of the coordinates desired;
 c. the third one of said arrays being disposed in a plane further away from the source of light than the said two arrays;
 d. one of the said diffusing means for producing a virtual source of said beam being associated with said two coplanar arrays and is a screen which is partially light-transmitting to allow undiffused light to pass to said second diffusing means and partially diffusing to produce a virtual source of said beam for the first-mentioned imaging means; and
 e. the said circuit arrangement includes integrator means for detecting the centre of distribution of the said video output signals.

14. Apparatus according to claim 13 wherein the screen is a diffusing screen perforated to a predetermined pattern of transmitting apertures and diffusing screen areas.

15. Apparatus according to claim 13 wherein the circuit arrangement includes means for sampling the respective video outputs of each said array and said integrator means measures the total intensity of illumination.

16. Apparatus according to claim 15 wherein means for starting and stopping the integration at substantially the same level is provided in the integrator device.

17. Apparatus according to claim 13 wherein at least one display and/or data processing unit is connected to the said circuit arrangement.

18. Apparatus according to claim 17 wherein said at least one display unit is a digital display board having ± deviation indications for said at least one coordinate as well as a no-deviation indication, means being provided for locking the indications in the case where in use of the beam fails to reach the target, and means for giving, after a predetermined time, an audio and/or visual warning.

* * * * *

UNITED STATES PATENT AND TRADEMARK OFFICE
CERTIFICATE OF CORRECTION

PATENT NO. : 4,039,825
DATED : August 2, 1977
INVENTOR(S) : Keith G. Doyle

It is certified that error appears in the above-identified patent and that said Letters Patent are hereby corrected as shown below:

In column 6, line 6 add a bar above the capital letter "G";

In claim 1, line 29 before "for producing" add the word "means";

In claim 4, line 2 spell "having" thusly; and

In claim 11, line 42 add a hyphen between the words "first" and "mentioned".

Signed and Sealed this

Sixth Day of December 1977

[SEAL]

Attest:

RUTH C. MASON
*Attesting Officer*

LUTRELLE F. PARKER
*Acting Commissioner of Patents and Trademarks*